United States Patent
Duan et al.

(10) Patent No.: US 11,747,260 B2
(45) Date of Patent: Sep. 5, 2023

(54) DIGITAL IMAGING TECHNOLOGY-BASED METHOD FOR CALCULATING RELATIVE PERMEABILITY OF TIGHT CORE

(71) Applicant: SOUTHWEST PETROLEUM UNIVERSITY, Chengdu (CN)

(72) Inventors: Yonggang Duan, Chengdu (CN); Zhenglan Li, Chengdu (CN); Quantang Fang, Chengdu (CN); Mingqiang Wei, Chengdu (CN); Yu Peng, Chengdu (CN); Shihao Wei, Chengdu (CN); Zijian Wu, Chengdu (CN); Shuyao Sheng, Chengdu (CN)

(73) Assignee: SOUTHWEST PETROLEUM UNIVERSITY, Chengdu (CN)

(*) Notice: Subject to any disclaimer, the term of this patent is extended or adjusted under 35 U.S.C. 154(b) by 422 days.

(21) Appl. No.: 17/087,647

(22) Filed: Nov. 3, 2020

(65) Prior Publication Data
US 2021/0047925 A1   Feb. 18, 2021

(30) Foreign Application Priority Data
Nov. 14, 2019   (CN) .......................... 201911111053.X (51) Int. Cl.
| | | |
|---|---|---|
| G01N 15/08 | (2006.01) | |
| E21B 49/08 | (2006.01) | |
| E21B 49/02 | (2006.01) | |
| G06T 17/05 | (2011.01) | |
| G06T 17/00 | (2006.01) | |

(52) U.S. Cl.
CPC .......... *G01N 15/088* (2013.01); *E21B 49/02* (2013.01); *E21B 49/0875* (2020.05); *G01N 15/0826* (2013.01); *G06T 17/00* (2013.01); *G06T 17/05* (2013.01); *G01N 2015/0846* (2013.01)

(58) Field of Classification Search
None
See application file for complete search history.

(56) References Cited

PUBLICATIONS

Yu, B. and Liu, W. (2004), Fractal analysis of permeabilities for porous media. AIChE J., 50: 46-57. https://doi.org/10.1002/aic.10004 (Year: 2004).*

* cited by examiner

*Primary Examiner* — Edwin C Gunberg (57) ABSTRACT

The invention discloses a digital imaging technology-based method for calculating relative permeability of tight core, comprising the following steps: step S1: preparing a small column sample of tight core satisfying resolution requirements; step S2: scanning the sample by MicroCT-400 and establish a digital core; step S3: performing statistical analysis on parameters reflecting the characteristics of rock pore structure and shape according to the digital core; step S4: calculating tortuosity fractal dimension DT and porosity fractal dimension Df by a 3D image fractal box dimension algorithm; step S5: performing statistical analysis on maximum pore equivalent diameter λmax and minimum pore equivalent diameter λmin by a label. The present invention solves the problems of time consumption of experiment, instrument accuracy, incapability of repeated calculation simulations and resource waste by repeated physical experiment.

10 Claims, 5 Drawing Sheets

DIGITAL IMAGING TECHNOLOGY-BASED METHOD FOR CALCULATING RELATIVE PERMEABILITY OF TIGHT CORE

BACKGROUND TECHNOLOGY

Technical Field

The invention relates to the field of analysis of microphysical properties of tight rock, in particular to a digital imaging technology-based method for calculating relative permeability of tight core.

Description of Related Art

The tight reservoir is currently the focus of research on the development of unconventional oil and gas resources, with great commercial value. The flow of oil and gas in low-permeability tight reservoir is often accompanied by non-Darcy flow. In order to effectively characterize the effect of non-Darcy flow at low speed, the threshold pressure gradient is introduced. Due to the low permeability and the threshold pressure gradient, the measurement of relative permeability curve takes a long time and has poor accuracy. Therefore, it is very critical to establish a method for calculating relative permeability with consideration of low permeability characteristics of porous media.

For the tight reservoir, there are two ways to obtain the permeability curve. One is the displacement experiment, and the other is the theoretical calculation. Due to the low permeability of tight reservoirs, it takes a long time to obtain the relative permeability curve by the displacement experiment, takes a long time to stabilize the flow rate, and requires high accuracy of measuring instruments. The theoretical calculation method is divided into two types: the steady displacement method and the dynamic displacement method. They are calculated based on steady Darcy's law and unsteady JBN theory. Neither the steady method nor the dynamic method considers the influence of rock morphological characteristics (such as rock internal structure and pore distribution) on the relative permeability curve. The calculated permeability curve is often quite different from the measured curve. Therefore, it is necessary to consider the influence of the threshold pressure gradient and the capillary force, and combine the characteristics of the rock pore structure to find a calculation method suitable for the low-permeability tight rock.

SUMMARY

In order to solve the problems in the prior art, the present invention provides a digital imaging technology-based method for calculating relative permeability of tight core to solve the problems.

The technical solution employed in the present invention is a digital imaging technology-based method for calculating relative permeability of tight core, including the following steps:

Step S1: preparing a small column sample of tight core satisfying resolution requirements;

Step S2: scanning the sample by MicroCT-400 and establishing a digital core;

Step S3: performing statistical analysis on parameters reflecting rock pore structures and shape characteristics according to the digital core;

Step S4: calculating a tortuosity fractal dimension $D_T$ and a porosity fractal dimension $D_f$ by a 3D image fractal box dimension algorithm;

Step S5: performing statistical analysis on maximum pore equivalent diameter $\lambda_{max}$ and minimum pore equivalent diameter $\lambda_{min}$ by a label;

Step S6: simulating a water-oil displacement in single fractal capillary, calculating a critical capillary diameter $\lambda_{cr}$, and obtaining the critical capillary diameter at a displacement time t;

Step S7: determining a fluid type at an outflow end with the critical capillary diameter, calculating a water-phase fluid volume $V_w$ and a pore volume $V_p$ in the tight core at the time t, and then calculating a water saturation $S_w$ of the core;

Step S8: calculating a flow rate $Q_s$ of a single phase flow;

Step S9: simulating the water-oil displacement in the low-permeability tight core, and calculating the oil phase flow rate $Q_o$ and water phase flow rate $Q_w$ at the outflow end at the time t;

Step S10: calculating the relative permeability $k_{rw}$ of water phase and the relative permeability $k_{ro}$ of oil phase at the displacement time t;

Step S11: changing the time t and judging whether the water saturation $S_w$ remains unchanged; if so, go to Step S12; if not, return to Step S6; and Step S12: plotting a relative permeability curve.

Preferably, the tight core mentioned in Step S1 is 5 to 10 mm in diameter, and greater than 10 mm in length.

Preferably, Step S2 includes the following sub-steps:

Step S21: performing CT scanning with appropriate lens and reconstruct 3D image data according to a size of the core;

Step S22: defining and selecting Region of Interest (ROI) in 3D image data; and

Step S23: performing filtering and threshold segmentation on ROI to obtain 3D digital core of pore structure distribution.

Preferably, the 3D image fractal box dimension algorithm mentioned in Step S4 comprises the following sub-steps:

Step S41: based on the graph statistics parameters obtained in Step S3, drawing N(r)~r diagram in log-log coordinates and a negative slope of the line is the value of fractal dimension $D_f$, $$lgN(r)=lga-D_f lgr;$$

where, $D_f$ is porosity fractal dimension, r is pore equivalent diameter, N(r) is the number of pores with radius greater than r, a is a constant coefficient; Step S42: the porosity φ of the core is obtained by image statistics and the average tortuosity is calculated by the following formula:

$$\tau = \frac{1}{2}\left[1 + \frac{1}{2}\sqrt{1-\varphi} + \sqrt{1-\varphi}\sqrt{\left(\frac{1}{\sqrt{1-\varphi}}-1\right)^2 + \frac{1}{4}}/(1-\sqrt{1-\varphi})\right];$$

where, τ is tortuosity, φ is porosity; and

Step S43: calculating the tortuosity fractal dimension $D_T$ by the following formula:

$$D_T = 1 + \frac{\ln \tau}{\ln\left(\frac{L_m}{2r_{av}}\right)};$$

where, $D_T$ is the tortuosity fractal dimension, $r_{av}$ is a mean pore radius, $L_m$ is a characteristic length obtained by:

$$L_m = \sqrt{\frac{1-\varphi}{\varphi}\frac{\pi D_f r_{max}^2}{2-D_f}};$$

where, $r_{max}$ is a maximum pore radius.

Preferably, Step S6 comprises the following sub-steps:

Step S61: at a given time t, for a single capillary with the capillary equivalent diameter $\lambda \geq \lambda_{cr}$, determining that there is only single-phase water flow, and the fluid at the outflow end is water;

Step S62: for a single equivalent capillary with the capillary equivalent diameter $\lambda < \lambda_{cr}$, determining that there is oil and water flow, and the fluid at the outflow end is oil; and Step S63: dividing the capillary in the porous medium into two parts for analysis: the single capillary with $\lambda \geq \lambda_{cr}$, and the single capillary with $\lambda < \lambda_{cr}$.

Preferably, the calculation formula of the critical capillary diameter mentioned in Step S6 is:

$$\lambda_{cr}^{2D_T} + 4\lambda_{cr}^{2D_T-1}\frac{\delta\cos\theta}{\Delta p} - \frac{\lambda_{cr}^{D_T+1}J_oL^{D_T}}{\Delta p} - \frac{16(\mu_w+\mu_o)L^{2D_T}}{\Delta pt} = 0;$$

where, $J_o$ is threshold pressure gradient of oil phase, $\delta$ is surface tension; $\theta$ is contact angle, $\mu w$ is water phase viscosity, $\mu o$ is oil phase viscosity, $\lambda cr$ is critical capillary diameter, $\Delta p$ is pressure difference between the two ends of the core, t is time, in s, L is core length, and DT is tortuosity fractal dimension.

Preferably, the calculation formula of water phase volume Vw in Step S7 is:

$$V_w = -\int_{\lambda_{min}}^{\lambda_{cr}}\frac{\pi\lambda^2}{4}X_TdN - \int_{\lambda_{cr}}^{\lambda_{max}}\frac{\pi\lambda^2}{4}L_TdN.$$

The calculation formula of pore volume Vp is:

$$V_P = -\int_{\lambda_{min}}^{\lambda_{max}}\frac{\pi\lambda^2}{4}L_TdN = \frac{\pi D_f\lambda_{max}^{3-D_f}L^{D_f}}{4(3-D_T-D_f)}\left[1-\left(\frac{\lambda_{min}}{\lambda_{max}}\right)^{3-D_T-D_f}\right].$$

The calculation formula of water saturation Sw of the core is:

$$S_w = \frac{V_w}{V_P} = \frac{\frac{3-D_T-D_f}{L^{D_f}\lambda_{max}^{3-D_T-D_f}}\int_{\lambda_{min}}^{\lambda_{cr}}X^{D_T}\lambda^{2-D_T-D_f}d\lambda + \left[1-\left(\frac{\lambda_{cr}}{\lambda_{max}}\right)^{(3-D_T-D_f)}\right]}{\left[1-\left(\frac{\lambda_{min}}{\lambda_{max}}\right)^{3-D_T-D_f}\right]};$$

where, DT is tortuosity fractal dimension, Df is porosity fractal dimension, $\lambda$max is maximum pore equivalent diameter, $\lambda$min is minimum pore equivalent diameter, $\lambda$cr is critical capillary diameter, LT is actual length of the fractal capillary tube bundle, XT is linear length of a fractal capillary tube bundle, and N is the number of capillary bundles.

Preferably, the calculation formula of single-phase fluid flow rate Qs mentioned in Step S8 is:

$$Q_s = -\int_{\lambda_{min}}^{\lambda_{max}}qdN = \int_{\lambda_{min}}^{\lambda_{max}}\frac{\pi\lambda^4}{128}\cdot\frac{\lambda^{D_T-1}\Delta p - J_wL^{D_T}}{\mu_wL^{D_T}}D_f\lambda_{max}^{D_f}\lambda^{-(D_f+1)}d\lambda;$$

where, DT is tortuosity fractal dimension, Df is porosity fractal dimension, $\lambda$max is maximum pore equivalent diameter, $\lambda$min is minimum pore equivalent diameter, $\mu$w is water phase viscosity, and $\Delta p$ is pressure difference between the two ends of the core.

Preferably, the calculation formula of oil phase flow rate Qo at the outflow end mentioned in Step S9 is:

$$Q_o = -\int_{\lambda_{min}}^{\lambda_{cr}}qdN = \frac{\pi D_f\lambda_{max}^{D_f}\Delta p}{128}\int_{\lambda_{min}}^{\lambda_{cr}}\frac{\lambda^{2+D_T-D_j}}{(\mu_w-\mu_o)X^{D_T}+\mu_oL^{D_T}}d\lambda +$$
$$\frac{\pi D_f\lambda_{max}^{D_f}\delta\cos\theta}{32}\int_{\lambda_{min}}^{\lambda_{cr}}\frac{\lambda^{1+D_T-D_j}}{(\mu_w-\mu_o)X^{D_T}+\mu_oL^{D_r}}d\lambda -$$
$$\frac{\pi D_f\lambda_{max}^{D_f}}{128}\int_{\lambda_{min}}^{\lambda_{cr}}\frac{(X^{D_T}(J_w-J_o)+J_oL^{D_T})\lambda^{3-D_j}}{(\mu_w-\mu_o)X^{D_T}+\mu_oL^{D_T}}d\lambda.$$

The calculation formula of water phase flow rate Qw is:

$$Q_w = -\int_{\lambda_{cr}}^{\lambda_{max}}qdN = \frac{\pi D_f\lambda_{max}^{D_f}\Delta p}{128\mu_wL^{D_T}(D_T+3-D_f)}\left(\lambda_{max}^{D_T+3-D_f}-\lambda_{cr}^{D_T+3-D_f}\right) -$$
$$\frac{\pi D_f\lambda_{max}^{D_f}J_w}{128\mu_w(4-D_f)}\left(\lambda_{max}^{4-D_f}-\lambda_{cr}^{4-D_f}\right);$$

where, $\lambda$cr is critical capillary diameter, Df is porosity fractal dimension, $\lambda$cr is critical capillary diameter, w is water phase viscosity, and Jw is threshold pressure gradient of water phase.

Preferably, the relative permeability krw of water phase and the relative permeability kro of oil phase at displacement time t mentioned in Step S10 can be obtained according to Darcy's law of single-phase flow $$k = \frac{Q_s\mu L}{A\Delta p}$$

and Darcy's law of two-phase flow $$k_i = \frac{Q_i\mu_iL}{A\Delta p};$$

$$k_{rw} = \frac{k_w}{k} = \frac{Q_w}{Q_s};$$

$$k_{ro} = \frac{k_o}{k} = \frac{\mu_o}{\mu_w}\frac{Q_o}{Q_s};$$

where, Qw is water phase flow rate, Qo is oil phase flow rate at outflow end, Qs is single-phase fluid flow rate, w is water phase viscosity, and $\mu$o is oil phase viscosity.

The digital imaging technology-based method for calculating relative permeability of tight core of the present invention has the following beneficial effects:

1. This method considers the influence of the threshold pressure gradient and the capillary pressure, and reflects the characteristics of the low-permeability tight core.
2. This method is based on the fractal capillary number model of porous media to calculate the relative permeability, which avoids the problems related to time consumption and instrument accuracy.
3. The present invention is to establish associated digital core of actual rock sample based on the results of laboratory CT scanning experiment, take into account the influence of rock morphological characteristics (such as rock internal structure and pore distribution) on the relative permeability curve, and repeat calculations and simulations for many times, avoiding resource waste caused by repeated physical experiments.

DETAIL DESCRIPTION

The following is a description of the preferred embodiments of the present invention to facilitate those skilled in the art to understand the present invention. However, it should be understood that the present invention is not limited to the scope of the preferred embodiments. For persons of ordinary skill in the art, these changes are obvious without departing from the spirit and scope of the present invention defined and determined by the appended claims, and all inventions and creations using the concept of the present invention are protected.

Figure 1:
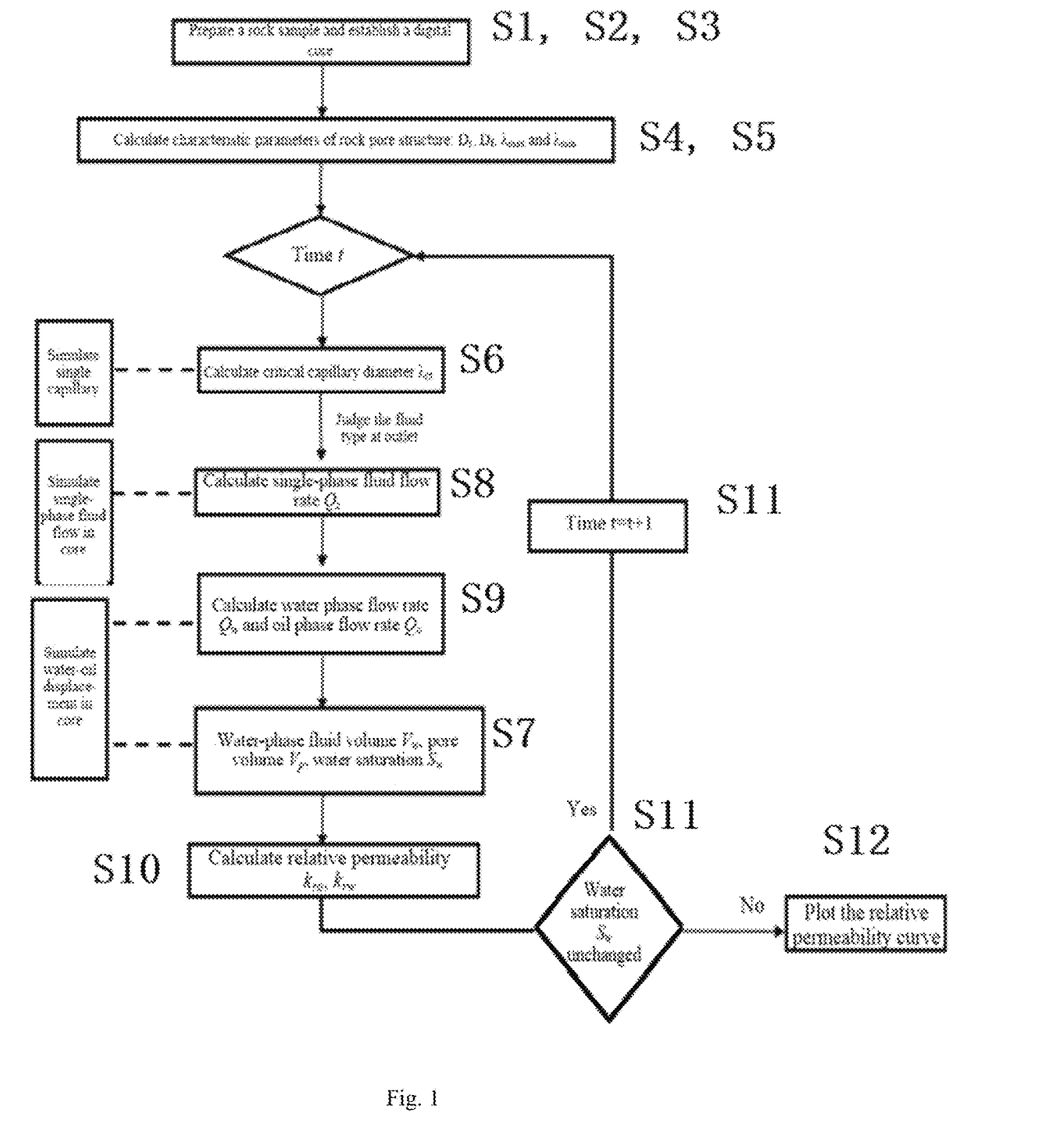
FIG. 1 is a flow chart for calculating relative permeability of tight core provided for the digital imaging technology-based method for calculating relative permeability of tight core in the present invention.

A digital imaging technology-based method for calculating relative permeability of tight core, as shown in FIG. 1, comprising the following steps:

Step S1: preparing a small column sample of tight core satisfying resolution requirements;

Step S2: scanning the sample by MicroCT-400 and establishing a digital core;

Step S3: performing statistical analysis on parameters reflecting rock pore structures and shape characteristics according to the digital core;

Step S4: calculating a tortuosity fractal dimension $D_r$ and a porosity fractal dimension $D_f$ by a 3D image fractal box dimension algorithm;

Step S5: performing statistical analysis on maximum pore equivalent diameter Amax and minimum pore equivalent diameter $\lambda_{min}$ by a label;

Step S6: simulating a water-oil displacement in single fractal capillary, calculating a critical capillary diameter $\lambda_{cr}$, and obtaining the critical capillary diameter at a displacement time t;

Step S7: determining a fluid type at an outflow end with the critical capillary diameter, calculating a water-phase fluid volume $V_w$ and a pore volume $V_p$ in the tight core at the time t, and then calculating a water saturation $S_w$ of the core;

Step S8: calculating a flow rate $Q_s$ of a single phase flow;

Step S9: simulating the water-oil displacement in the low-permeability tight core, and calculating the oil phase flow rate $Q_o$ and water phase flow rate $Q_w$ at the outflow end at the time t;

Step S10: calculating the relative permeability $k_{rw}$ of water phase and the relative permeability $k_{ro}$ of oil phase at the displacement time t;

Step S11: changing the time t and judging whether the water saturation $S_w$ remains unchanged; if so, go to Step S12; if not, return to Step S6; and Step S12: plotting a relative permeability curve.

In this embodiment, the tight core mentioned in Step S1 is 5 to 10 mm in diameter, and greater than 10 mm in length.

In this embodiment, Step S2 including the following sub-steps:

Step S21: performing CT scanning with appropriate lens and reconstruct 3D image data according to a size of the core;

Step S22: defining and selecting Region of Interest (ROI) in 3D image data; and

Step S23: performing filtering and threshold segmentation on ROI to obtain 3D digital core of pore structure distribution.

In this embodiment, the 3D image fractal box dimension algorithm mentioned in Step S4 includes the following sub-steps:

Step S41: based on the graph statistics parameters obtained in Step S3, drawing N(r)~r diagram in log-log coordinates and a negative slope of the line is the value of fractal dimension $D_f$, $$lgN(r) = lga - D_f lgr;$$

where, $D_f$ is porosity fractal dimension, r is pore equivalent diameter, N(r) is the number of pores with radius greater than r, a is a constant coefficient;

Step S42: the porosity φ of the core is obtained by image statistics and the average tortuosity is calculated by the following formula:

$$\tau = \frac{1}{2}\left[1 + \frac{1}{2}\sqrt{1-\varphi} + \sqrt{1-\varphi}\sqrt{\left(\frac{1}{\sqrt{1-\varphi}}-1\right)^2 + \frac{1}{4}}/(1-\sqrt{1-\varphi})\right];$$

where, τ is tortuosity, φ is porosity; and

Step S43: calculating the tortuosity fractal dimension $D_T$ by the following formula:

$$D_T = 1 + \frac{\ln \tau}{\ln\left(\frac{L_m}{2r_{av}}\right)};$$

where, $D_T$ is the tortuosity fractal dimension, $r_{av}$ is a mean pore radius, $L_m$ is a characteristic length obtained by:

$$L_m = \sqrt{\frac{1\varphi}{\varphi} \frac{\pi D_f r_{max}^2}{2 - D_f}};$$

where, $r_{max}$ is a maximum pore radius.

Figure 3:
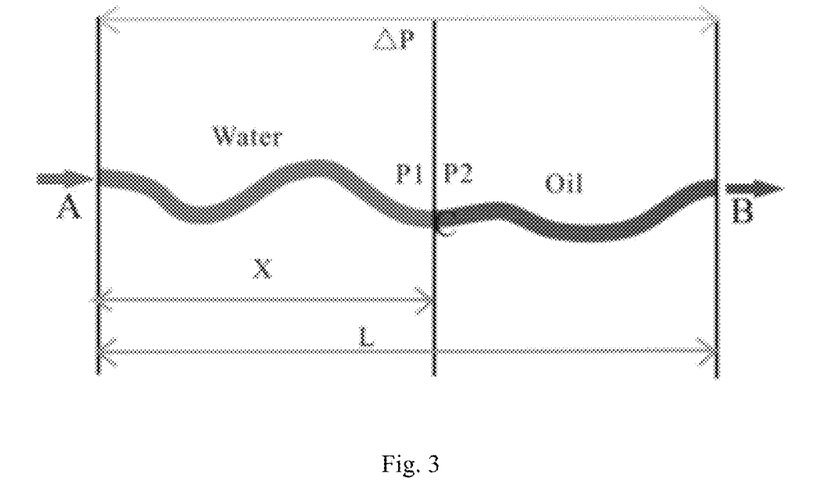
FIG. 3 is a schematic diagram of single fractal capillary flow involved in the calculation with the digital imaging technology-based method for calculating relative permeability of tight core in the present invention.
Figure 4:
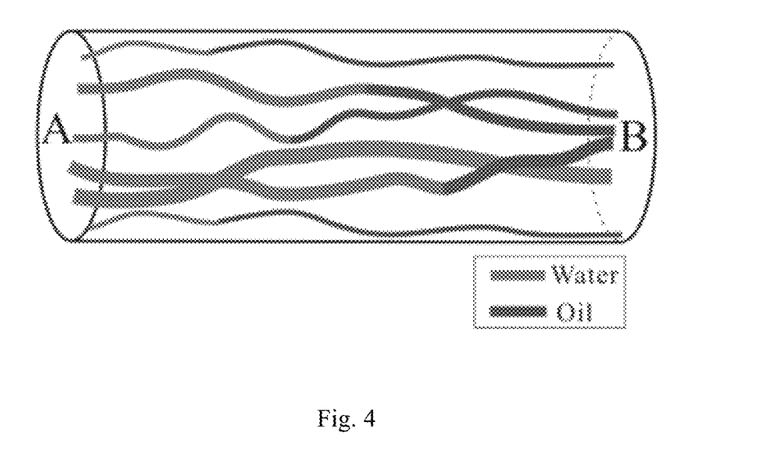
FIG. 4 is a schematic diagram of core water-oil displacement fractal capillary flow involved in the calculation with the digital imaging technology-based method for calculating relative permeability of tight core in the present invention.

As shown in FIG. 3, in this embodiment, Step S6 includes the following sub-steps:

Step S61: at a given time t, for a single capillary with the capillary equivalent diameter $\lambda \geq \lambda_{cr}$, determining that there is only single-phase water flow, and the fluid at the outflow end is water;

Step S62: for a single equivalent capillary with the capillary equivalent diameter $\lambda < \lambda_{cr}$, determining that there is oil and water flow, and the fluid at the outflow end is oil; and Step S63: dividing the capillary in the porous medium into two parts for analysis: the single capillary with $\lambda \geq \lambda_{cr}$ and the single capillary with $\lambda < \lambda_{cr}$.

In this embodiment, the calculation formula of the critical capillary diameter mentioned in Step S6 is:

$$\lambda_{cr}^{2D_T} + 4\lambda_{cr}^{2D_T-1} \frac{\delta\cos\theta}{\Delta p} - \frac{\lambda_{cr}^{D_T+1} J_o L^{D_T}}{\Delta p} - \frac{16(\mu_w + \mu_o)L^{2D_T}}{\Delta p t} = 0;$$

where, Jo is threshold pressure gradient of oil phase, $\delta$ is surface tension; $\theta$ is contact angle, w is water phase viscosity, μo is oil phase viscosity, $\lambda_{cr}$ is critical capillary diameter, $\Delta p$ is pressure difference between the two ends of the core, t is time, in s, L is core length, and DT is tortuosity fractal dimension.

In this embodiment, the calculation formula of water phase volume Vw mentioned in Step S7 is:

$$V_w = -\int_{\lambda_{min}}^{\lambda_{cr}} \frac{\pi\lambda^2}{4} X_T dN - \int_{\lambda_{cr}}^{\lambda_{max}} \frac{\pi\lambda^2}{4} L_T dN.$$

The calculation formula of pore volume Vp is:

$$V_P = -\int_{\lambda_{min}}^{\lambda_{max}} \frac{\pi\lambda^2}{4} L_T dN = \frac{\pi D_f \lambda_{max}^{3-D_T} L^{D_f}}{4(3 - D_T - D_f)}\left[1 - \left(\frac{\lambda_{min}}{\lambda_{max}}\right)^{3-D_T-D_f}\right]$$

The calculation formula of water saturation Sw of the core is:

$$S_w = \frac{V_w}{V_p} = \frac{\frac{(3 - D_T - D_f)}{L^{D_f}\lambda_{max}^{3-D_T-D_f}}\int_{\lambda_{min}}^{\lambda_{cr}} X^{D_T}\lambda^{2-D_T-D_f}d\lambda + \left[1 - \left(\frac{\lambda_{cr}}{\lambda_{max}}\right)^{3-D_T-D_f}\right]}{\left[1 - \left(\frac{\lambda_{min}}{\lambda_{max}}\right)^{3-D_T-D_f}\right]};$$

where, DT is tortuosity fractal dimension, Df is porosity fractal dimension, λmax is maximum pore equivalent diameter, λmin is minimum pore equivalent diameter, λcr is critical capillary diameter, LT is actual length of the fractal capillary bundle, XT is linear length of a fractal capillary tube bundle, and N is the number of capillary bundles.

In this embodiment, the calculation formula of single-phase fluid flow rate Qs mentioned in Step S8 is:

$$Q_s = -\int_{\lambda_{min}}^{\lambda_{max}} qdN = \int_{\lambda_{min}}^{\lambda_{max}} \frac{\pi\lambda^4}{128} \cdot \frac{\lambda^{D_T-1}\Delta p - J_w L^{D_T}}{\mu_w L^{D_T}} D_f \lambda_{max}^{D_f} \lambda^{-(D_f+1)} d\lambda$$

where, DT is tortuosity fractal dimension, Df is porosity fractal dimension, λmax is maximum pore equivalent diameter, λmin is minimum pore equivalent diameter, pw is water phase viscosity, and Δp is pressure difference between the two ends of the core.

In this embodiment, the calculation formula of oil phase flow rate Qo at the outflow end mentioned in Step S9 is:

$$Q_o = -\int_{\lambda_{min}}^{\lambda_{cr}} qdN = \frac{\pi D_f \lambda_{max}^{D_f} \Delta p}{128} \int_{\lambda_{min}}^{\lambda_{cr}} \frac{\lambda^{2+D_T-D_f}}{(\mu_w - \mu_o)X^{D_T} + \mu_o L^{D_T}} d\lambda +$$

$$\frac{\pi D_f \lambda_{max}^{D_f} \delta\cos\theta}{32} \int_{\lambda_{min}}^{\lambda_{cr}} \frac{\lambda^{1+D_T-D_f}}{(\mu_w - \mu_o)X^{D_T} + \mu_o L^{D_T}} d\lambda -$$

$$\frac{\pi D_f \lambda_{max}^{D_f}}{128} \int_{\lambda_{min}}^{\lambda_{cr}} \frac{(X^{D_T}(J_w - J_o) + J_o L^{D_T})\lambda^{3-D_f}}{(\mu_w - \mu_o)X^{D_T} + \mu_o L^{D_T}} d\lambda;$$

The calculation formula of water phase flow rate Qw is:

$$Q_w = -\int_{\lambda_{cr}}^{\lambda_{max}} qdN = \frac{\pi D_f \lambda_{max}^{D_f} \Delta p}{128\mu_w L^{D_T}(D_T + 3 - D_f)}\left(\lambda_{max}^{D_T+3-D_f} - \lambda_{cr}^{D_T+3-D_f}\right)$$

$$-\frac{\pi D_f \lambda_{max}^{D_f} J_w}{128\mu_w(4 - D_f)}\left(\lambda_{max}^{4-D_f} - \lambda_{cr}^{4-D_f}\right);$$

where, λcr is critical capillary diameter, Df is porosity fractal dimension, λcr is critical capillary diameter, μw is water phase viscosity, and Jw is threshold pressure gradient of water phase.

In this embodiment, the relative permeability krw of water phase and the relative permeability kro of oil phase at displacement time t mentioned in Step S10 can be obtained according to Darcy's law of single-phase flow $$k = \frac{Q_s \mu L}{A\Delta p}$$

and Darcy's law of two-phase flow $$k_i = \frac{Q_i \mu_i L}{A\Delta p};$$

$$k_{rw} = \frac{k_w}{k} = \frac{Q_w}{Q_s};$$

$$k_{ro} = \frac{k_o}{k} = \frac{\mu_o}{\mu_w}\frac{Q_o}{Q_s};$$

where, Qw is water phase flow rate, Qo is oil phase flow rate at outflow end, Qs is single-phase fluid flow rate, μw is water phase viscosity, and μo is oil phase viscosity.

Figure 2:
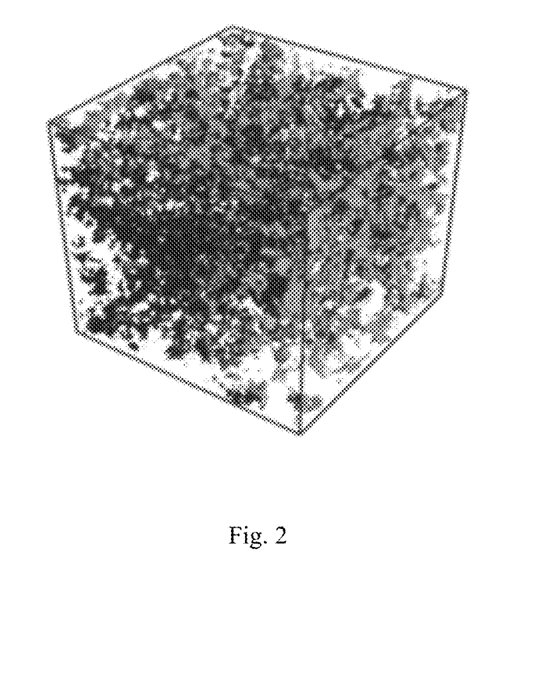
FIG. 2 is a digital core diagram obtained by an embodiment of the digital imaging technology-based method for calculating relative permeability of tight core in the present invention.

When the embodiments are implemented, in Embodiment 1:

(1) Select low-permeability tight sandstone sample, prepare a small column sample satisfying resolution requirements, with a size of 8 mm (diameter)×20 mm, and then scan the sample and establish a digital core by MicroCT-400, as shown in FIG. 2.

(2) Calculate tortuosity fractal dimension DT=1.1 and porosity fractal dimension Df=1.3 by 3D image fractal box dimension algorithm, and perform statistical analysis on maximum pore equivalent diameter λmax=2.6×10−5 m and minimum pore equivalent diameter λmin=4.3×10−8 m by a label.

(3) Taking t=0 as the starting time, calculate associated critical capillary diameter, and judge the distribution of all capillary fluids in the core at that time.

(4) Simulate and calculate single-phase fluid flow rate Qs, then calculate water phase flow rate Qw and oil phase flow rate Qo at t=0.

(5) Simulate and calculate water-phase fluid volume, pore volume and water saturation in the core at t=0.

(6) Calculate relative permeability kro and krw corresponding to water saturation.

Figure 5:
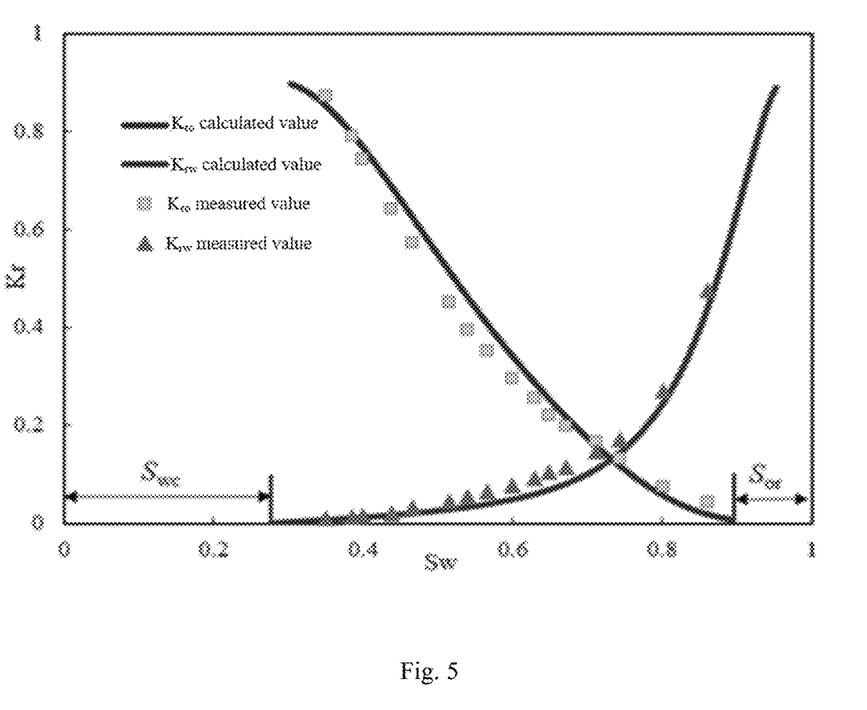
FIG. 5 is a comparison diagram of the measured data and the relative permeability curve obtained in Embodiment 1 of the digital imaging technology-based method for calculating relative permeability of tight core in the present invention.

(7) Repeat the steps (3) to (6) of Embodiment 1, calculate the parameters at the next time Step St=1, and then t+1, until the calculated core water saturation remains unchanged, and plot a relative permeability curve, as shown in FIG. 5.

Comparing the relative permeability curve based on calculated values with the measured data, it can be seen that the calculation reliability is high. The embodiment provides a convincing evidence for the beneficial effects of the present invention.

In Embodiment 2:

(1) Select different porosity fractal dimensions Df=1.3, 1.4 and 1.5, the same tortuosity fractal dimension DT, maximum pore equivalent diameter λmax and minimum pore equivalent diameter λmin as the characteristic values of the core pore structure parameters, and use them to calculate the influence of difference porosity fractal dimensions on the relative permeability curve.

(2) Taking t=0 as the starting time, calculate associated critical capillary diameter, and judge the distribution of all capillary fluids in the core at that time.

(3) Simulate and calculate single-phase fluid flow rate Qs, then calculate water phase flow rate Qw and oil phase flow rate Qo at t=0.

(4) Simulate and calculate water-phase fluid volume, pore volume and water saturation in the core at t=0.

(5) Calculate relative permeability kro and krw corresponding to water saturation.

Figure 6:
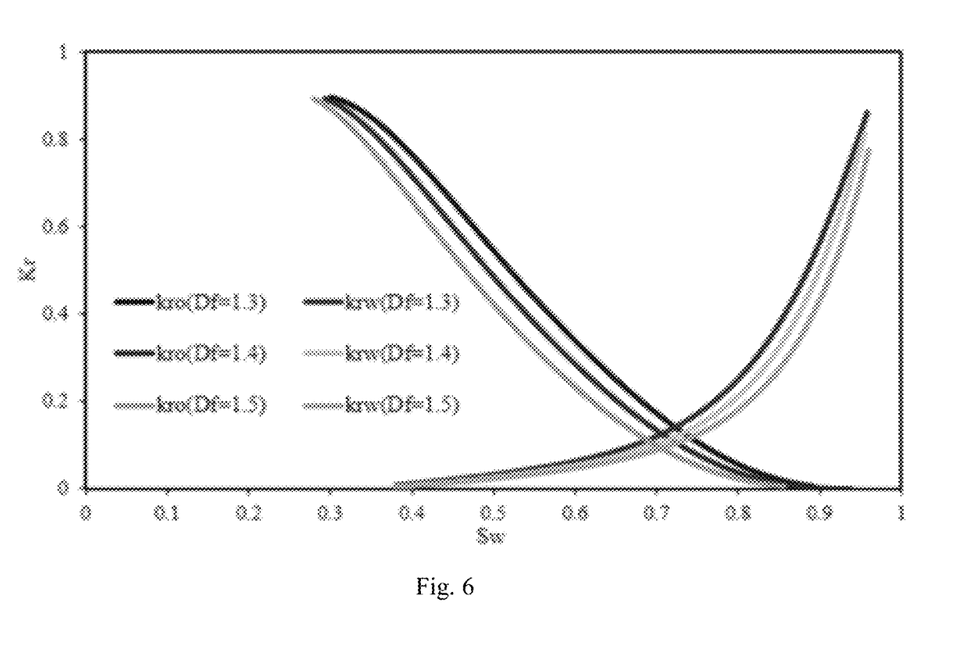
FIG. 6 is a comparison diagram of relative permeability curve corresponding to different fractal dimensions obtained in Embodiment 2 of the digital imaging technology-based method for calculating relative permeability of tight core in the present invention.

(6) Repeat the steps (3) to (5) of Embodiment 2, calculate the parameters at the next time Step St=1, and then t+1, until the calculated core water saturation remains unchanged, and plot a relative permeability curve, as shown in FIG. 6.

What is claimed is:

1. A digital imaging technology-based method for calculating relative permeability of tight core, comprising the following steps:

Step S1: preparing a small column sample of tight core satisfying resolution requirements;

Step S2: scanning the sample by MicroCT-400 and establishing a digital core;

Step S3: performing statistical analysis on parameters reflecting rock pore structures and shape characteristics according to the digital core;

Step S4: calculating a tortuosity fractal dimension $D_T$ and a porosity fractal dimension $D_f$ by a 3D image fractal box dimension algorithm;

Step S5: performing statistical analysis on maximum pore equivalent diameter $\lambda_{max}$ and minimum pore equivalent diameter $\lambda_{min}$ by a label;

Step S6: simulating a water-oil displacement in single fractal capillary, calculating a critical capillary diameter $\lambda_{cr}$, and obtaining the critical capillary diameter at a displacement time t;

Step S7: determining a fluid type at an outflow end with the critical capillary diameter, calculating a water-phase fluid volume $V_w$ and a pore volume $V_p$ in the tight core at the time t, and then calculating a water saturation $S_w$ of the core;

Step S8: calculating a flow rate $Q_s$ of a single phase flow;

Step S9: simulating the water-oil displacement in the low-permeability tight core, and calculating the oil phase flow rate $Q_o$ and water phase flow rate $Q_w$ at the outflow end at the time t;

Step S10: calculating the relative permeability $k_{rw}$ of water phase and the relative permeability $k_{ro}$ of oil phase at the displacement time t;

Step S11: changing the time t and judging whether the water saturation $S_w$ remains unchanged; if so, go to Step S12; if not, return to Step S6; and Step S12: plotting a relative permeability curve.

2. The digital imaging technology-based method for calculating relative permeability of tight core according to claim 1, wherein the tight core in Step S1 is 5 to 10 mm in diameter, and greater than 10 mm in length.

3. The digital imaging technology-based method for calculating relative permeability of tight core according to claim 1, wherein Step S2 comprises the following sub-steps:

Step S21: performing CT scanning with appropriate lens and reconstruct 3D image data according to a size of the core;

Step S22: defining and selecting Region of Interest (ROI) in 3D image data; and

Step S23: performing filtering and threshold segmentation on ROI to obtain 3D digital core of pore structure distribution.

4. The digital imaging technology-based method for calculating relative permeability of tight core according to claim 1, wherein the 3D image fractal box dimension algorithm in Step S4 comprises the following sub-steps:

Step S41: based on the graph statistics parameters obtained in Step S3, drawing N(r)~r diagram in log-log coordinates and a negative slope of the line is the value of fractal dimension $D_f$, $lgN(r) = lga - D_f lgr$;

where, $D_f$ is porosity fractal dimension, r is pore equivalent diameter, N(r) is the number of pores with radius greater than r, a is a constant coefficient;

Step S42: the porosity p of the core is obtained by image statistics and the average tortuosity is calculated by the following formula:

$$\tau = \frac{1}{2}\left[1 + \frac{1}{2}\sqrt{1-\varphi} + \sqrt{1-\varphi}\sqrt{\left(\frac{1}{\sqrt{1-\varphi}}-1\right)^2 + \frac{1}{4}}\bigg/(1-\sqrt{1-\varphi})\right];$$

where, τ is tortuosity, φ is porosity; and

Step S43: calculating the tortuosity fractal dimension $D_T$ by the following formula:

$$D_T = 1 + \frac{\ln \tau}{\ln\left(\frac{L_m}{2r_{av}}\right)};$$

where, $D_T$ is the tortuosity fractal dimension, $r_{av}$ is a mean pore radius, $L_m$ is a characteristic length obtained by:

$$L_m = \sqrt{\frac{1-\varphi}{\varphi} \frac{\pi D_f r_{max}^2}{2-D_f}};$$

where, $r_{max}$ is a maximum pore radius.

5. The digital imaging technology-based method for calculating relative permeability of tight core according to claim 1, wherein Step S6 comprises the following sub-steps:

Step S61: at a given time t, for a single capillary with the capillary equivalent diameter $\lambda \geq \lambda_{cr}$, determining that there is only single-phase water flow, and the fluid at the outflow end is water;

Step S62: for a single equivalent capillary with the capillary equivalent diameter $\lambda < \lambda_{cr}$, determining that there is oil and water flow, and the fluid at the outflow end is oil; and Step S63: dividing the capillary in the porous medium into two parts for analysis: the single capillary with $\lambda \geq \lambda_{cr}$ and the single capillary with $\lambda < \lambda_{cr}$.

6. The digital imaging technology-based method for calculating relative permeability of tight core according to claim 4, wherein the calculation formula of the critical capillary diameter in Step S6 is:

$$\lambda_{cr}^{2D_T} + 4\lambda_{cr}^{2D_T-1}\frac{\delta \cos\theta}{\Delta p} - \frac{\lambda_{cr}^{D_T+1} J_o L^{D_T}}{\Delta p} - \frac{16(\mu_w + \mu_o)L^{2D_T}}{\Delta p t} = 0;$$

where, $J_o$ is a threshold pressure gradient of oil phase, δ is a surface tension; θ is a contact angle, $\mu_w$ is a water phase viscosity, $\mu_o$ is an oil phase viscosity, $\lambda_{cr}$ is the critical capillary diameter, $\Delta p$ is a pressure difference between the two ends of the core, t is the time, in s, L is a core length, and $D_T$ is the tortuosity fractal dimension.

7. The digital imaging technology-based method for calculating relative permeability of tight core according to claim 1, wherein the calculation formula of the water phase volume $V_w$ in Step S7 is:

$$V_w = -\int_{\lambda_{min}}^{\lambda_{cr}} \frac{\pi \lambda^2}{4} X_T dN - \int_{\lambda_{cr}}^{\lambda_{max}} \frac{\pi \lambda^2}{4} L_T dN;$$

the calculation formula of the pore volume $V_p$ is:

$$V_P = -\int_{\lambda_{min}}^{\lambda_{max}} \frac{\pi \lambda^2}{4} L_T dN = \frac{\pi D_f \lambda_{max}^{3-D_T} L^{D_f}}{4(3 - D_T - D_f)}\left[1 - \left(\frac{\lambda_{min}}{\lambda_{max}}\right)^{3-D_T-D_f}\right];$$

the calculation formula of the water saturation $S_w$ of the core is:

$$S_w = \frac{V_w}{V_p} = \frac{\frac{(3-D_T-D_f)}{L^{D_f}\lambda_{max}^{3-D_T-D_f}}\int_{\lambda_{min}}^{\lambda_{cr}} X^{D_T}\lambda^{3-D_T-D_f}d\lambda + \left[1 - \left(\frac{\lambda_{cr}}{\lambda_{max}}\right)^{3-D_T-D_f}\right]}{\left[1 - \left(\frac{\lambda_{min}}{\lambda_{max}}\right)^{3-D_T-D_f}\right]};$$

where, $D_T$ is the tortuosity fractal dimension, $D_f$ is the porosity fractal dimension, $\lambda_{max}$ is the maximum pore equivalent diameter, $\lambda_{min}$ is the minimum pore equivalent diameter, $\lambda_{cr}$ is the critical capillary diameter, $L_T$ is actual length of the fractal capillary bundle, $X_T$ is a linear length of a fractal capillary tube bundle, and N is a number of capillary bundles.

8. The digital imaging technology-based method for calculating relative permeability of tight core according to claim 1, wherein the calculation formula of single-phase fluid flow rate $Q_s$ in Step S8 is:

$$Q_s = -\int_{\lambda_{min}}^{\lambda_{max}} qdN = \int_{\lambda_{max}}^{\lambda_{min}} \frac{\pi \lambda^4}{128} \cdot \frac{\lambda^{D_T-1}\Delta p - J_w L^{D_T}}{\mu_w L^{D_f}} D_f \lambda_{max}^{D_f} \lambda^{-(D_f+1)} d\lambda;$$

where, $D_T$ is the tortuosity fractal dimension, $D_f$ is the porosity fractal dimension, $\lambda_{max}$ is the maximum pore equivalent diameter, $\lambda_{min}$ is the minimum pore equivalent diameter, $\mu_w$ is the water phase viscosity, and $\Delta p$ is the pressure difference between the two ends of the core.

9. The digital imaging technology-based method for calculating relative permeability of tight core according to claim 1, wherein the calculation formula of oil phase flow rate $Q_o$ at the outflow end mentioned in Step S9 is:

$$Q_o = -\int_{\lambda_{min}}^{\lambda_{cr}} qdN = \frac{\pi D_f \lambda_{max}^{D_f}\Delta p}{128}\int_{\lambda_{min}}^{\lambda_{cr}} \frac{\lambda^{2+D_T-D_f}}{(\mu_w - \mu_o)X^{D_T} + \mu_o L^{D_T}}d\lambda +$$
$$\frac{\pi D_f \lambda_{max}^{D_f}\delta\cos\theta}{32}\int_{\lambda_{min}}^{\lambda_{cr}} \frac{\lambda^{1+D_T-D_f}}{(\mu_w - \mu_o)X^{D_T} + \mu_o L^{D_T}}d\lambda -$$
$$\frac{\pi D_f \lambda_{max}^{D_f}}{128}\int_{\lambda_{min}}^{\lambda_{cr}} \frac{(X^{D_T}(J_w - J_o) + J_o L^{D_T})\lambda^{3-D_f}}{(\mu_w - \mu_o)X^{D_T} + \mu_o L^{D_T}}d\lambda;$$

the calculation formula of water phase flow rate Qw is:

$$Q_w = -\int_{\lambda_{cr}}^{\lambda_{max}} qdN = \frac{\pi D_f \lambda_{max}^{D_f}\Delta p}{128\mu_w L^{D_T}(D_T + 3 - D_f)}\left(\lambda_{max}^{D_T+3-D_f} - \lambda_{cr}^{D_T+3-D_f}\right)$$
$$-\frac{\pi D_f \lambda_{max}^{D_f} J_w}{128\mu_w(4 - D_f)}\left(\lambda_{max}^{4-D_f} - \lambda_{cr}^{4-D_f}\right);$$

where, $\lambda_{cr}$ is the critical capillary diameter, $D_f$ is the porosity fractal dimension, $\lambda_{cr}$ is the critical capillary diameter, $\mu_w$ is the water phase viscosity, and $J_w$ is the threshold pressure gradient of water phase.

10. The digital imaging technology-based method for calculating relative permeability of tight core according to claim 1, wherein the relative permeability $k_{rw}$ of water phase and the relative permeability $k_{ro}$ of oil phase at the displacement time t in Step S10 is obtained according to Darcy's law of single-phase flow $$k = \frac{Q_s \mu L}{A \Delta p}$$

and Darcy's law of two-phase flow $$k_i = \frac{Q_i \mu_i L}{A \Delta p};$$

$$k_{rw} = \frac{k_w}{k} = \frac{Q_w}{Q_s}$$

$$k_{ro} = \frac{k_o}{k} = \frac{\mu_o}{\mu_w} \frac{Q_o}{Q_s};$$

where, $Q_w$ is water phase flow rate, $Q_o$ is oil phase flow rate at outflow end, $Q_s$ is single-phase fluid flow rate, $\mu_w$ is water phase viscosity, and $\mu_o$ is oil phase viscosity.

* * * * *